(12) United States Patent
Newman et al.

(10) Patent No.: US 11,462,016 B2
(45) Date of Patent: Oct. 4, 2022

(54) OPTIMAL ASSISTANCE FOR OBJECT-REARRANGEMENT TASKS IN AUGMENTED REALITY

(71) Applicant: Meta Platforms Technologies, LLC, Menlo Park, CA (US)

(72) Inventors: Benjamin Alexander Newman, Pittsburgh, PA (US); Kevin Thomas Carlberg, Kirkland, WA (US); Ruta Parimal Desai, Redmond, WA (US); James Hillis, Bloomington, IN (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/319,963

(22) Filed: May 13, 2021

(65) Prior Publication Data

US 2022/0114366 A1 Apr. 14, 2022

Related U.S. Application Data

(60) Provisional application No. 63/091,832, filed on Oct. 14, 2020.

(51) Int. Cl.
*G06V 20/20* (2022.01)
(52) U.S. Cl.
CPC .................... *G06V 20/20* (2022.01)
(58) Field of Classification Search
CPC ............ G06V 20/20; G02B 2027/0138; G02B 2027/014; G02B 2027/0187; G02B 27/017; G02B 27/0093; G06F 3/011; G06F 1/163; G06F 3/014; G06F 3/016; G06F 3/0481
See application file for complete search history.

(56) References Cited

U.S. PATENT DOCUMENTS

| | | | | |
|---|---|---|---|---|
| 2009/0066725 | A1* | 3/2009 | Nogami | G06F 3/016 345/418 |
| 2011/0115816 | A1* | 5/2011 | Brackney | H05B 47/19 700/295 |
| 2011/0310260 | A1* | 12/2011 | Jordan | G06F 3/0488 348/207.1 |
| 2012/0299909 | A1* | 11/2012 | Ueno | G06F 3/0346 345/419 |

(Continued)

OTHER PUBLICATIONS

International Search Report and Written Opinion for International Application No. PCT/US2021/051007, dated Jan. 5, 2022, 12 pages.

*Primary Examiner* — Jitesh Patel
(74) *Attorney, Agent, or Firm* — FisherBroyles, LLP

(57) ABSTRACT

The disclosed computer-implemented method may include identifying, via an artificial reality system, a plurality of physical objects in a real-world environment of a user and defining, based on identifying the plurality of objects, an object-manipulation objective for manipulating at least one of the plurality of objects. The method may also include determining an action sequence that defines a sequence of action steps for manipulating the at least one of the plurality of objects to complete the object-manipulation objective, and presenting, via the artificial reality system, a notification to the user indicative of the action sequence. Various other methods, systems, and computer-readable media are also disclosed.

20 Claims, 14 Drawing Sheets

(56) References Cited

U.S. PATENT DOCUMENTS

| | | | |
|---|---|---|---|
| 2014/0071164 A1* | 3/2014 | Saklatvala | G06F 3/04842 345/633 |
| 2015/0077435 A1* | 3/2015 | Koga | G06F 3/017 345/633 |
| 2016/0005207 A1* | 1/2016 | Jeon | G06T 13/40 345/474 |
| 2016/0055373 A1* | 2/2016 | Matsuda | G06V 10/462 382/103 |
| 2016/0140868 A1* | 5/2016 | Lovett | G06T 19/006 434/118 |
| 2016/0180602 A1* | 6/2016 | Fuchs | A63F 13/211 463/31 |
| 2017/0343375 A1* | 11/2017 | Kamhi | G01C 21/20 |
| 2019/0282324 A1 | 9/2019 | Freeman et al. | |

* cited by examiner

OPTIMAL ASSISTANCE FOR OBJECT-REARRANGEMENT TASKS IN AUGMENTED REALITY

CROSS REFERENCE TO RELATED APPLICATION

This application claims the benefit of U.S. Provisional Application No. 63/091,832, filed 14 Oct. 2020, the disclosure of is incorporated, in their entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
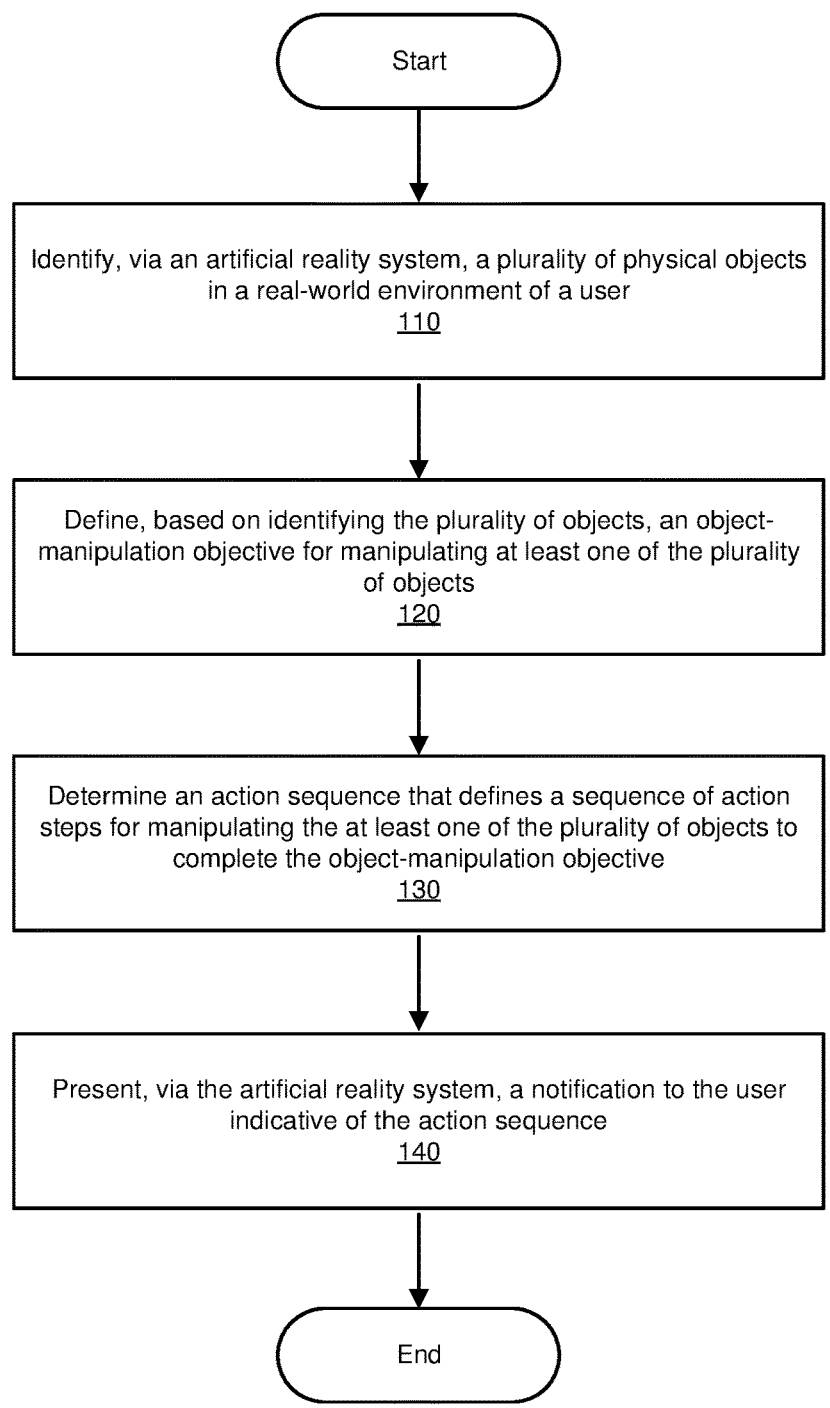
FIG. 1 is a flow diagram of an exemplary method for using artificial reality systems to assist with object-manipulation objectives.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

People often perform routine tasks, such as household chores, packing for a trip, etc., with little to no preplanning. For example, a person may start a task with a nearest or easiest step and move on to other steps. The person may move on to another step without completing a current step, forget one or more steps, and/or proceed through steps in an order or fashion that may unintentionally add difficulty.

Artificial-reality devices, such as augmented-reality glasses, may have access to real-time, high-fidelity data regarding a user's environment via onboard sensors, as well as an ability to seamlessly display real-time information to the user. Thus, when the user is performing a task, an artificial-reality device may be able to analyze the user's environment and provide feedback in real time. By leveraging the computational resources of artificial-reality devices, the user may be able to perform the task more efficiently.

The present disclosure is generally directed to providing assistance with object-manipulation tasks. As will be explained in greater detail below, embodiments of the present disclosure may define an object-manipulation objective for a user based on identifying physical objects in a real-world environment of the user. The systems and methods disclosed herein may determine an action sequence for the user to perform the object-manipulation objective and present notifications indicative of the action sequence. Thus, the disclosed systems and methods may be flexible with respect to the types of tasks the user may wish to perform as well as the assistance provided. In addition, by using object recognition as a basis for defining the object-manipulation objective, the disclosed systems and methods may more efficiently determine the action sequence and reduce computing overhead. The disclosed systems and methods may further improve the field of artificial reality as well as user interfaces.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-13, detailed descriptions of methods and systems for providing assistance for object-manipulation objectives in artificial reality. Descriptions of a method for providing assistance for object-manipulation objectives are provided in connection with FIG. 1. Example systems and devices for providing assistance for object-manipulation objectives are described in connection with FIGS. 2, 3, 9, 10, 11, 12, and 13. Descriptions of exemplary tasks are provided in connection with FIGS. 4, 5, and 6. Descriptions of exemplary user interfaces are provided in connection with FIGS. 7 and 8A-8C.

FIG. 1 is a flow diagram of an exemplary computer-implemented method 100 for providing assistance in artificial reality for object-manipulation objectives. The steps shown in FIG. 1 may be performed by any suitable computer-executable code and/or computing system, including the systems illustrated in FIGS. 2, 3, 9, 10, 11, 12, and/or 13. In one example, each of the steps shown in FIG. 1 may represent an algorithm whose structure includes and/or is represented by multiple sub-steps, examples of which will be provided in greater detail below.

As illustrated in FIG. 1, at step 110 one or more of the systems described herein may identify, via an artificial reality system, a plurality of physical objects in a real-world environment of a user. For example, identification module 204 in FIG. 2 may identify various physical objects detected in a real-world environment of a user.

Figure 2:
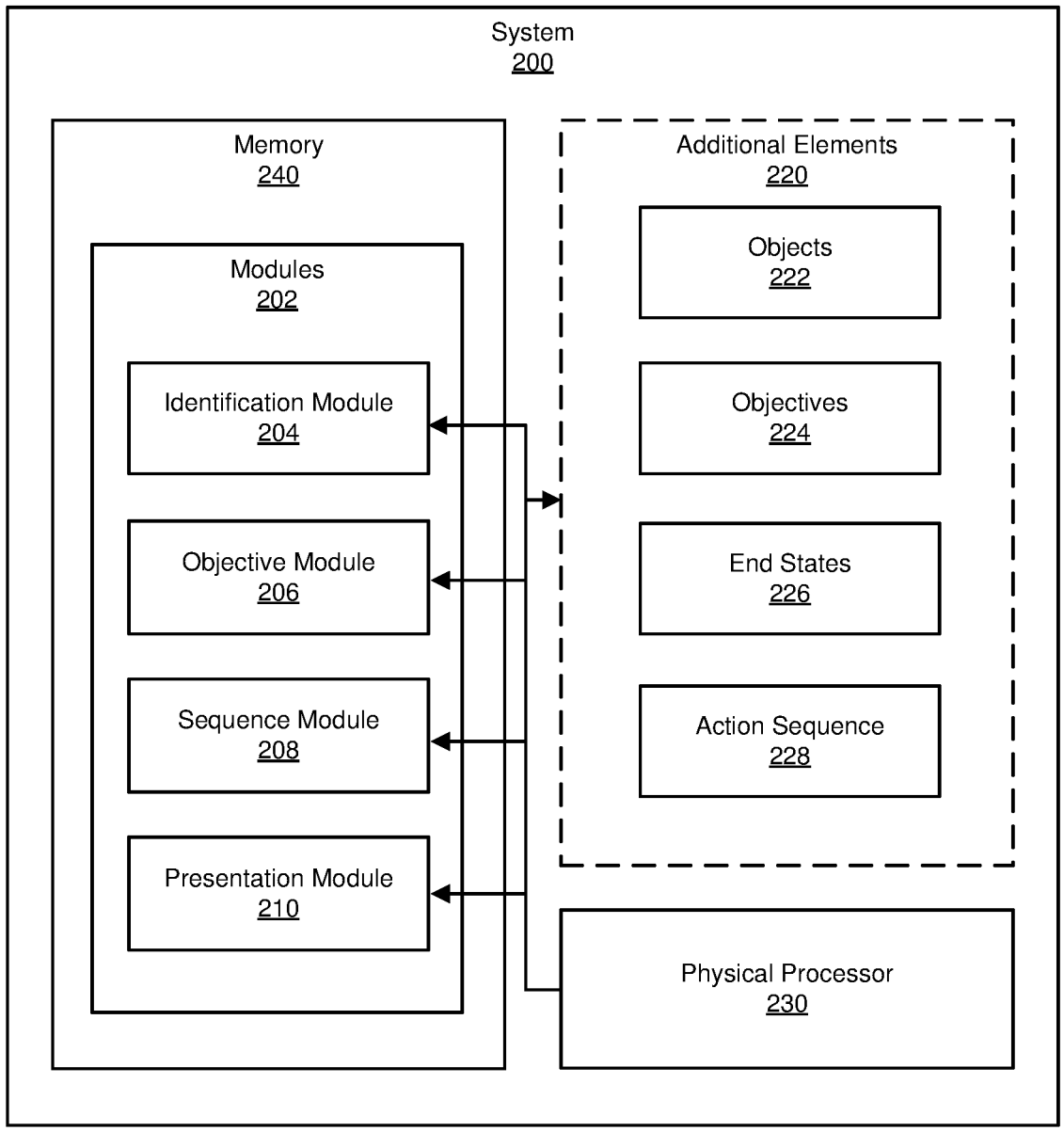
FIG. 2 is a block diagram of an exemplary system for assisting with object-manipulation objectives.

Various systems described herein may perform step 110. FIG. 2 is a block diagram of an example system 200 for providing assistance for object-manipulation objectives. As illustrated in this figure, example system 200 may include one or more modules 202 for performing one or more tasks. As will be explained in greater detail herein, modules 202 may include an identification module 204, an objective module 206, a sequence module 208, and a presentation module 210. Although illustrated as separate elements, one or more of modules 202 in FIG. 2 may represent portions of a single module or application.

In certain embodiments, one or more of modules 202 in FIG. 2 may represent one or more software applications or programs that, when executed by a computing device, may cause the computing device to perform one or more tasks. For example, and as will be described in greater detail below, one or more of modules 202 may represent modules stored and configured to run on one or more computing devices, such as the devices illustrated in FIG. 3 (e.g., computing device 302 and/or server 306). One or more of modules 202 in FIG. 2 may also represent all or portions of one or more special-purpose computers configured to perform one or more tasks.

As illustrated in FIG. 2, example system 200 may also include one or more memory devices, such as memory 240. Memory 240 generally represents any type or form of volatile or non-volatile storage device or medium capable of storing data and/or computer-readable instructions. In one example, memory 240 may store, load, and/or maintain one or more of modules 202. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, example system 200 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more of modules 202 stored in memory 240. Additionally or alternatively, physical processor 230 may execute one or more of modules 202 to facilitate maintain the mapping system. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, example system 200 may also include one or more additional elements 220, such as objects 222, objectives 224, end states 226, and an actions sequence 228. One or more of additional elements 220 may be stored on a local storage device, such as memory 240, or may be accessed remotely. Objects 222 may represent data relating to objects in the real-world environment of the user, as will be explained further below. Objectives 224 may represent data relating to one or more object-manipulation objectives for the user for manipulating physical objects in the real-world environment, as will be explained further below. End states 226 may represent data relating to end states of one or more objects in the real-world environment, as will be explained further below. Action sequence 228 may represent data relating to a sequence of action steps for the user to complete the object-manipulation objectives, as will be explained further below.

Example system 200 in FIG. 2 may be implemented in a variety of ways. For example, all or a portion of example system 200 may represent portions of example network environment 300 in FIG. 3.

Figure 3:
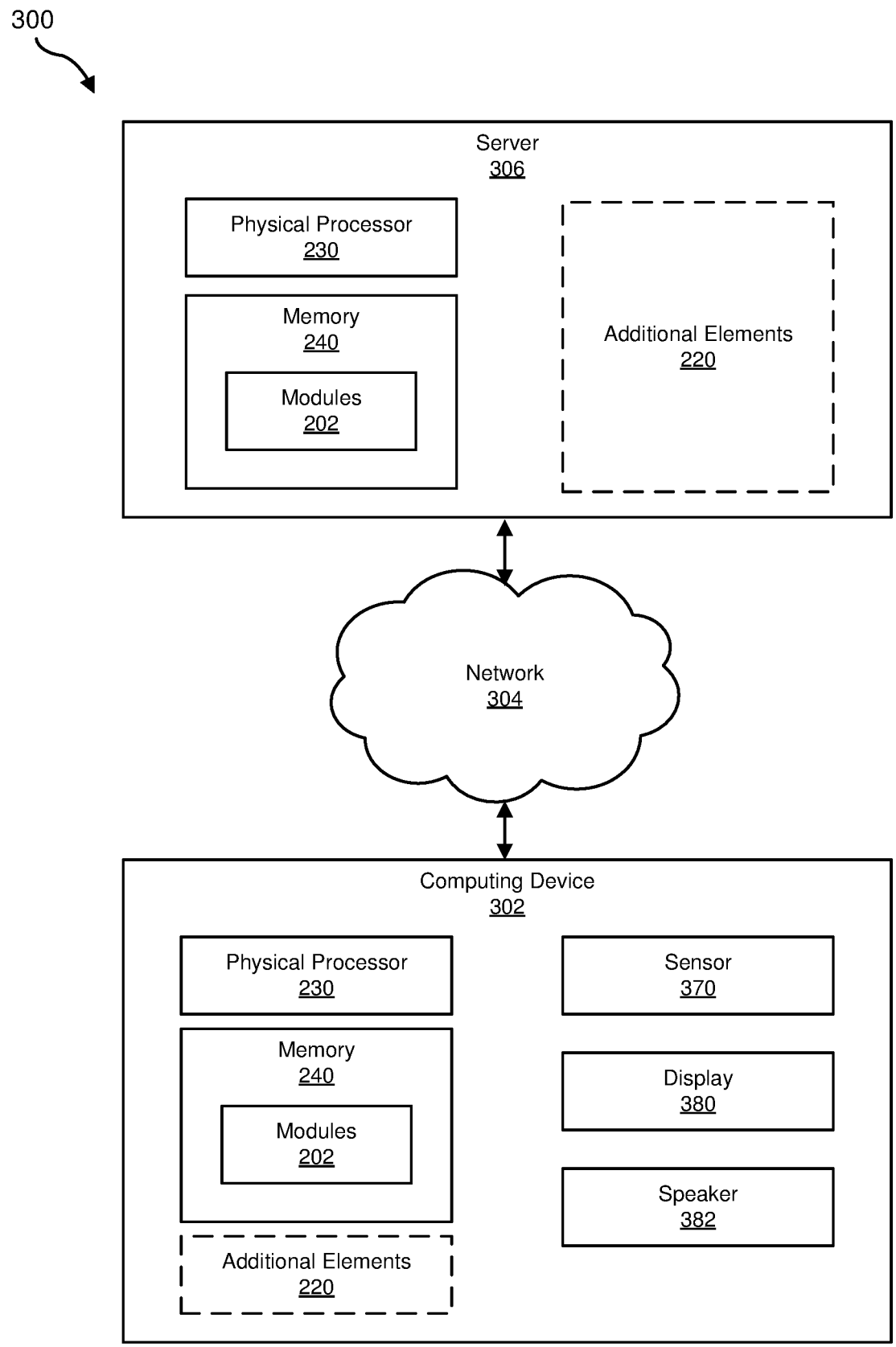
FIG. 3 is a block diagram of an exemplary network for an artificial reality system.

FIG. 3 illustrates an exemplary network environment 300 implementing aspects of the present disclosure. The network environment 300 includes computing device 302, a network 304, and server 306. Computing device 302 may be a client device or user device, such as an artificial reality system (e.g., augmented-reality system 900 in FIG. 9, virtual-reality system 1000 in FIG. 10, vibrotactile system 1100 in FIG. 11, head-mounted display 1202 and haptic device 1204 in FIG. 12, augmented reality system 1300 in FIG. 13), a desktop computer, laptop computer, tablet device, smartphone, or other computing device. Computing device 302 may include a physical processor 230, which may be one or more processors, memory 240, which may store data such as one or more of additional elements 220, a sensor 370 capable of detecting objects 222 from the environment, and a display 380. In some implementations, computing device 302 may represent an augmented reality device such that display 380 overlays images onto a user's view of his or her local environment. For example, display 380 may include a transparent medium that allows light from the user's environment to pass through such that the user may see the environment. Display 380 may then draw on the transparent medium to overlay information. Alternatively, display 380 may project images onto the transparent medium and/or onto the user's eyes. Computing device 302 may also include a speaker 382 for sound output.

Sensor 370 may include one or more sensors, such as a camera as well as other sensors capable of detecting features and/or objects in the environment, such as a microphone, an inertial measurement unit (IMU), a gyroscope, a GPS device, etc. Computing device 302 may be capable of detecting and identifying objects 222 using sensor 370 for sending to server 306.

Server 306 may represent or include one or more servers capable of processing data for an artificial reality environment. Server 306 may, for example, track user positions as well as objects in the artificial reality environment using signals from computing device 302. Server 306 may include a physical processor 230, which may include one or more processors, memory 240, which may store modules 202, and one or more of additional elements 220.

Computing device 302 may be communicatively coupled to server 306 through network 304. Network 304 may represent any type or form of communication network, such as the Internet, and may comprise one or more physical connections, such as LAN, and/or wireless connections, such as WAN.

Returning to FIG. 1, the systems described herein may perform step 110 in a variety of ways. In one example, identification module 204, as part of computing device 302 and/or server 306, may receive artificial reality signals, such as visual data captured by sensor 370, and process the received signals (e.g., using computer vision) to identify physical objects in the user's real-world environment, and store the identified objects and related data as objects 222. For example, objects 222 may include object identifiers, object locations and/or poses, object classifiers, etc.

In some examples, the identified objects (e.g., objects 222) may include known objects and unknown objects. For instance, objects 222 may include objects that were previously identified or otherwise match with known objects in the user's real-world environment. Objects 222 may also include objects that are newly identified or otherwise not matching any known objects. The unknown objects may correspond to physical objects newly added to the user's real-world environment, or may correspond to physical objects with unknown aspects, such as an object in an unexpected location, an object with an unrecognized configuration, an unexpected duplicate of a known object, an object not readily identifiable with the current artificial reality signals and/or available data, etc.

In some examples, objects 222 may include data on objects that are expected to be in the user's real-world environment. For instance, identification module 204 may recognize the user's real-world environment, which may be inside the user's home, and expect certain objects to be present, such as objects identified during a previous scan of the user's home. In some examples, failing to recognize an expected object, or detecting an expected object in an unexpected location may present an uncertainty, as will be described further below.

At step 120 one or more of the systems described herein may define, based on identifying the plurality of objects, an object-manipulation objective for manipulating at least one of the plurality of objects. For example, objective module 206 may define objectives 224 based on objects 222.

In some embodiments, the term "object-manipulation objective" may refer to one or more tasks or goals that may be achieved by manipulating one or more objects. An object-manipulation objective may relate to a user's desired manipulation of one or more objects. An object-manipulation objective may range in complexity from simple (e.g., requiring a single object manipulation) to complex (e.g., requiring multiple actions). The object-manipulation objective may change over time, for instance as additional data is acquired, as objects are manipulated, etc. Examples of object-manipulation objectives may include, without limitation, cleaning a house, packing for a trip, shopping for items, organizing a living space, preparing food, assembling an item, fixing an item, etc.

The systems described herein may perform step 120 in a variety of ways. In one example, the object-manipulation objective may define a desired end state for the at least one of the plurality of objects. For example, objectives 224 may establish end states 226 with respect to objects 222. End states 226 may include data describing or otherwise defining the user's desired end state for one or more objects of objects 222. In other words, end states 226 may characterize a state (e.g., location, position, pose, composition, etc.) of one or more objects of objects 222 after accomplishing one or more objectives of objectives 224.

In some examples, objectives 224 may establish parameters, such as limitations (e.g., limitations on what actions may be performed), preferences, tolerances (e.g., an acceptable range for matching desired end states), assumptions (e.g., assumptions used for modeling a real-world environment), etc. The parameters may be predefined, user selected, dynamically updated, etc.

In some examples, defining the object-manipulation objective may further include inferring, based on contextual signals and the identification of the plurality of objects, a user goal with respect to the plurality of objects, and selecting, based on the inferred user goal, the object-manipulation objective from a library of objectives. Objective module 206 may infer a user goal of the user with respect to objects 222 based on contextual signals, such as a time of day, a user input, or a view of the user, as well as the identification of objects 222. For example, the user may routinely perform household chores at approximately the same time every day. Objective module 206 may recognize that at a particular time of day, the user may wish to perform a household chore, which may be defined as one or more object-manipulation objectives in a library of objectives that may be stored, for instance, in computing device 302 and/or server 306. Objective module 206 may also recognize that one of objects 222 may be specific to a particular chore. Thus, objective module 206 may infer the particular chore and select objectives 224 accordingly.

The library of objectives may include objectives that are predefined or otherwise previously established. The library of objectives may include parameters for objectives as described herein. Additionally, in some examples, the library of objectives may further include or define appropriate end states for each objective.

Figure 4A:
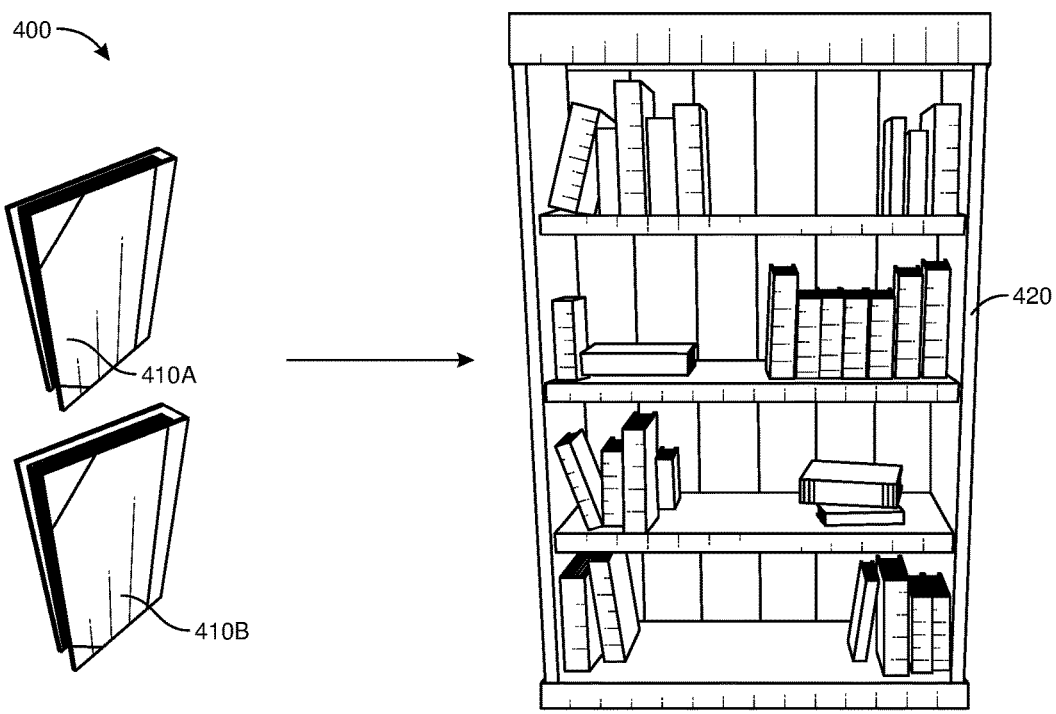
FIGS. 4A and 4B are illustrations of exemplary object-manipulation objectives.

FIG. 4A illustrates an objective 400 that may relate to books 410A and 410B, and a bookshelf 420. Objective 400 may correspond to a task or user goal of putting books into a bookshelf. Objective module 206 may infer, based on identifying one or more of book 410A, book 410B, and/or bookshelf 420, the user goal of putting books away in a bookshelf, and select an appropriate objective for objectives 224. Objective module 206 may further define end states 226 broadly (e.g., books 410A and 410B being in bookshelf 420) or with varying levels of specificity (e.g., book 410A and/or 410B being on a particular shelf, book 410A and/or 410B being next to a particular book or object, book 410A and/or 410B being in a specific location on a specific shelf, etc.).

Figure 4B:
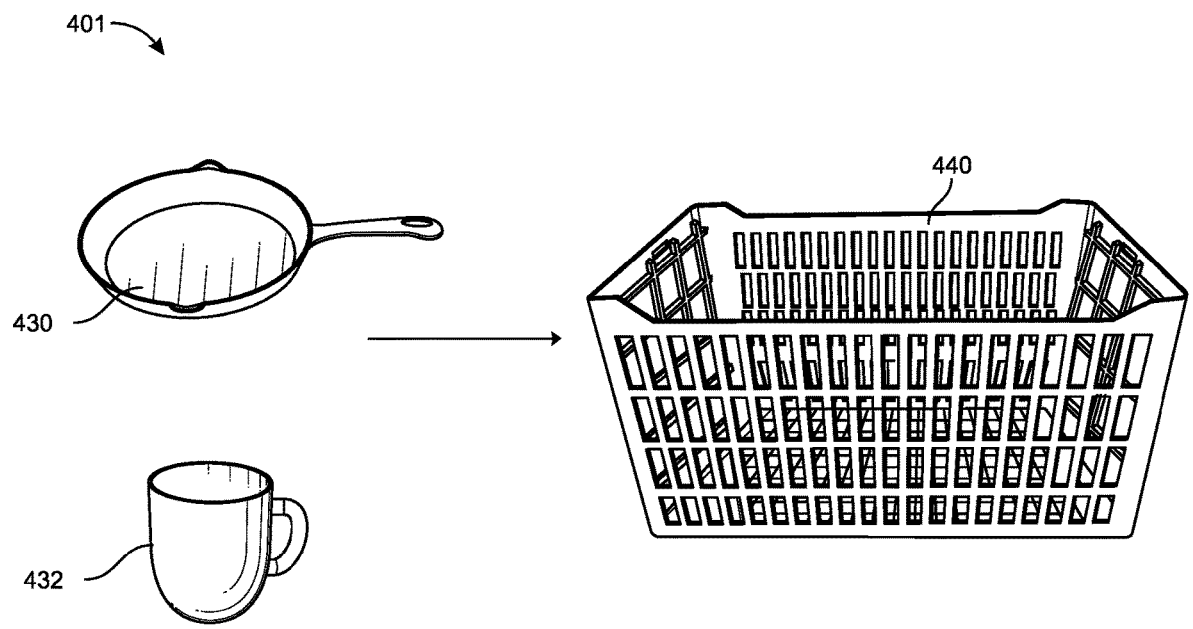

FIG. 4B illustrates an objective 401 that may relate to a pan 430, a cup 432, and a dish bin 440. Objective 401 may correspond to a task or user goal of putting dishes into a bin. Objective module 206 may infer, based on identifying one or more of pan 430, cup 432, and/or dish bin 440, the user goal of putting dishes away in a bin, and select an appropriate objective for objectives 224. Objective module 206 may further define end states 226 broadly (e.g., pan 430 and cup 432 being in dish bin 440) or with varying levels of specificity (e.g., pan 430 and/or cup 432 being on a particular shelf, pan 430 and/or cup 432 being next to a particular dish or object, book 410A and/or 410B being in a specific location within dish bin 440, etc.)

In some examples, inferring the user goal may further include inferring a plurality of user goals with respect to the plurality of objects. In such examples, selecting the object-manipulation objective may further include selecting a plurality of object-manipulation objectives from the library of objectives based on the plurality of user goals. Objective module 206 may infer multiple user goals and select, for objectives 224, as many objectives as may be needed for accomplishing the multiple user goals. Objective module 206 may further establish end states 226 based on final end states for objects 224 after merging objectives 224. For example, in FIG. 4A, the user goal may include a first user goal of putting away books and a second user goal of organizing the bookshelf. Rather than defining a first end state of book 410A being inside bookshelf 420 (to accomplish the first user goal) and a second end state of book 410A being in a particular location (to accomplish the second user goal), merging the user goals may result in a single end state of book 410A being in the particular location.

In some examples, the object-manipulation objective may include an object-rearrangement task for relocating the at least one of the plurality of objects to a desired location. Objective module 206 may determine that one or more of objects 222 may need to be relocated to a desired location.

For example, in FIG. 4B, pan 430 and/or cup 432 may need to be relocated from their respective current locations to inside dish bin 440.

The end states may be predefined in the library of objectives. In other examples, objective module 206 may analyze objects 222 and/or the user's environment with respect to objectives 224 to determine end states 226. For example, objective module 206 may associate a category of object with a particular location (e.g., books such as books 410A, 410B associating with bookshelf 420, dishes such as pan 430 and cup 432 associating with dish bin 440). In another example, objective module 206 may recognize certain objects may match with certain other objects (e.g., a lid with its corresponding case, a device and its corresponding charger, etc.). In yet another example, objective module 206 may analyze the user's environment to determine a suitable location for an object (e.g., finding an empty volume on a shelf to place an object). Alternatively, objective module 206 may determine, based on objectives 224, that end states 226 may include reconfigurations or transformations of objects 222 (e.g., combining objects when constructing or building, altering objects such as when cooking, etc.).

Returning to FIG. 1, at step 130 one or more of the systems described herein may determine an action sequence that defines a sequence of action steps for manipulating the at least one of the plurality of objects to complete the object-manipulation objective. For example, sequence module 208 may determine action sequence 228 for manipulating objects 222 into end states 226 to achieve objectives 224.

In some embodiments, the term "action sequence" may refer to a series or sequence of actions for manipulating objects, preparatory actions for manipulating objects, and/or actions in response to object manipulations. Examples of action sequences may include, without limitation, instructions, directions, guidelines, heuristics, recipes, etc.

The systems described herein may perform step 130 in a variety of ways. In one example, the action sequence may include an action step for manipulating the at least one of the plurality of objects to produce the desired end state. For example, if the objective includes an object-rearrangement task, the action sequence may include at least one action step for moving the at least one of the plurality of objects to the desired location.

In some examples, sequence module 208 may formalize or otherwise reframe objectives 224 as a computable problem to determine action sequence 228 that may produce end states 226. For example, if objectives 224 includes an object-rearrangement task, sequence module 208 may reframe the object-rearrangement task as solving a capacitated vehicle-routing problem (CVRP) or traveling salesman problem (TSP). The object-rearrangement task may involve the user moving to a location, picking up one or more objects, moving to another location, and dropping off the picked-up objects to complete the object rearrangement. The associated action sequence may involve various location visits which may be optimized by finding a sequence of location visits along shortest paths. Thus, determining an action sequence for the object-rearrangement task may be similar to solving CVRP or TSP from combinatorial optimization.

Figure 5:
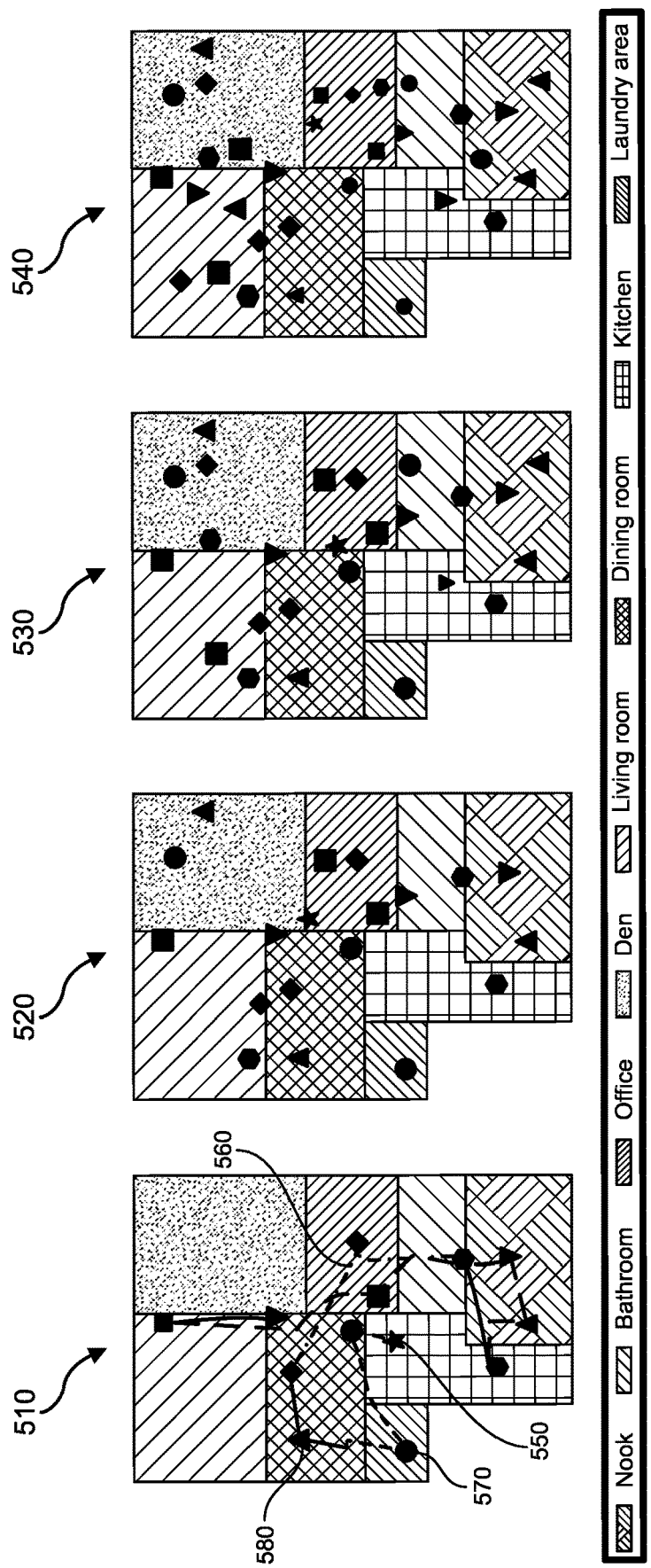
FIG. 5 is a diagram of potential action sequences for object-manipulation objectives.

FIG. 5 illustrates how an object-manipulation objective of organizing a house may be formalized as a CVRP. FIG. 5 includes states 510, 520, 530, and 540 of a user 550 and paths 560 between various objects 570, 580. Organizing the house may involve user 550 moving to the various objects 570, 580, picking up objects 570, 580, and placing them in appropriate locations (e.g., their respective end states), similar to a CVRP. An appropriate action sequence may be based on paths between objects 570, 580 that visits each and every object to be manipulated. Each path 560 may establish one or more action steps of the action sequence.

In some examples, the object-rearrangement task may include relevant parameters that may define limitations on user actions and other limitations to how actions of the action sequence may be determined. For example, in FIG. 5, the CVRP may include limitations such as limitations on how many objects the user may carry at a given time (e.g., two, which may assume one object per hand), how fast the user may be able to move, etc. In addition, the parameters may define how actions may be prioritized or ranked. For instance, for the CVRP, the action sequence may be optimized or otherwise prioritized based on reducing a time to completion, which may further be determined based on the user's movement speed, distance traveled, etc.

Figure 6:
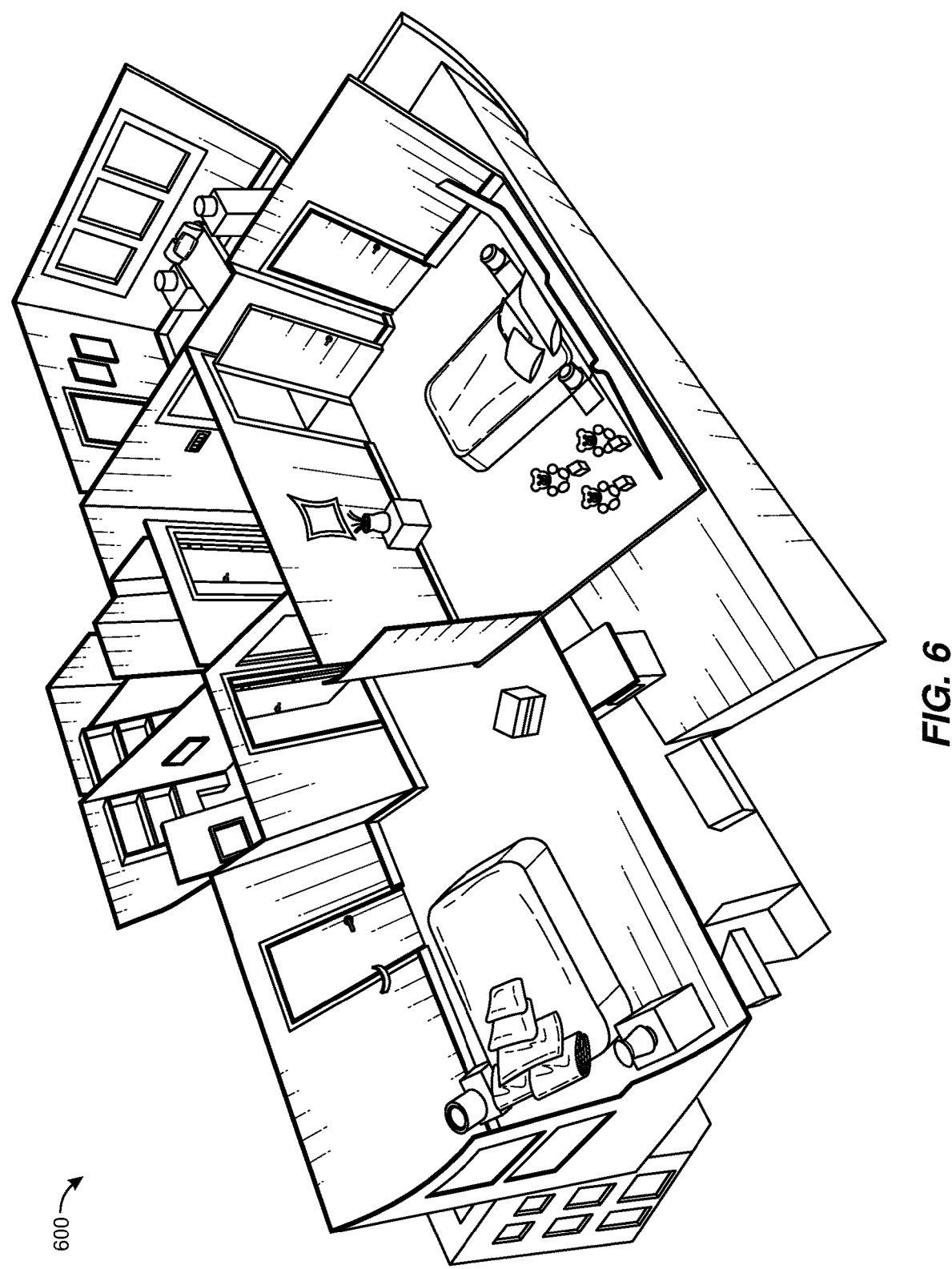
FIG. 6 is a diagram of a three-dimensional (3D) mapping for potential action sequences.

Although FIG. 5 illustrates how the user's environment may be mapped in two dimensions (2D), FIG. 6 illustrates a 3D map 600 in which an action sequence may be determined. Rather than 2D paths, the action sequence may be determined as 3D paths.

In other examples, sequence module 208 may analyze objectives 224 and end states 226 and determine that objectives 224 may be reframed into a different type of problem and accordingly solve the problem to determine action sequence 228. Although an object-rearrangement task is described herein, in other examples, other types of problems may be applied.

In some examples, determining the action sequence may include identifying a current state of the object-manipulation objective. Sequence module 208 may identify a current state of objectives 224. The current state may designate how close objectives 224 are to completion, and may further determine what additional action steps may be needed for action sequence 228. The current state may include current states for objects 222 such that action sequence 228 may include action steps for manipulating the current states for objects 222 into end states 226.

In addition to describing objects 222, the current state may describe the real-world environment as it relates to objectives 224. In some examples, the current state may include an uncertain state for a physical object associated with the object-manipulation objective. For example, if objectives 224 relates to packing for a trip, objectives 224 may include placing a toothbrush inside of a luggage. However, the current state may include an uncertain state for the toothbrush. For instance, the toothbrush may have not been identified in objects 222, such as if the toothbrush was not visible when identifying objects 222 or the toothbrush is lost or otherwise misplaced. In another example, a relevant object may not have been satisfactorily identified. For instance, the relevant object may have been viewed from an angle which did not allow identification module 204 to satisfactorily identify the relevance object (e.g., the available image data may not have produced a threshold probability of matching a known object). In yet another example, a relevant object may not be in a ready condition. For instance, a tool necessary to complete objectives 224 may require repair, cleaning, or other maintenance before usage. Identification module 204 and/or objective module 206 may not have been able to determine whether the tool is in a usable condition.

In some examples, the action sequence may include an action step that is expected to resolve the uncertain state. Sequence module 208 may include actions steps in action sequence 228 that may, with a reasonable expectation, resolve the uncertain state. In some examples, the action step may be included to directly resolve the uncertain state. For example, if a tool requires maintenance, an action step of performing the maintenance may be included in action sequence 228. In some examples, an action step that indirectly resolves the uncertain state may be included. An unrelated action step (e.g., an action step not designed to directly resolve the uncertain state), may reveal additional information that may resolve the uncertain state. For example, the user may travel to a location where a misplaced item may be expected or was last located in order to complete an action step. Identification module 204 and/or objective module 206 may continuously monitor the user's progress during action steps. More specifically, sequence module 208 may include an action step that may be expected to resolve the uncertain state. For instance, if a toothbrush is misplaced, an action step of retrieving toothpaste may be expected to resolve the uncertain state of the toothbrush (e.g., based on an expectation of the toothbrush being in a vicinity of the toothpaste). Sequence module 208 may include multiple action steps expected to resolve the uncertain state. For example, the action steps may take the user to various locations around an unknown object to provide image data captured from different angles to better enable identification module 204 to identify the unknown object. In addition, sequence module 208 may include a combination of direct and indirect resolution action steps. For example, sequence module 208 may include an action step for indirectly resolving the uncertain state, and later include an action step for directly resolving the uncertain state if not resolved by a previous action step.

At step 140 one or more of the systems described herein may present, via the artificial reality system, a notification to the user indicative of the action sequence. For example, presentation module 210 may provide a notification to the user indicative of action sequence 228.

The systems described herein may perform step 140 in a variety of ways. In one example, the notification may include at least one of a visual notification, a haptic notification, or an audible notification. For example, presentation module 210 may provide one or more of a visual notification, a haptic notification, and/or an audible notification via one or more of the systems illustrated in FIGS. 2, 3, 9, 10, 11, 12, and/or 13. The notification may be an instruction, status update, warning, or other guidance consistent with action sequence 228. For example, the notification may provide instructions or descriptions of one or more actions steps of action sequence 228. The notification may provide status updates, such as a percentage of completion of one or more action steps, changes to one or more relevant objects. The notification may provide warnings or other guidance, such as indicating if an action step is incomplete or performed incorrectly, indicating whether a relevant object is nearby, providing tips to performing a particular action step, etc.

Figure 7:
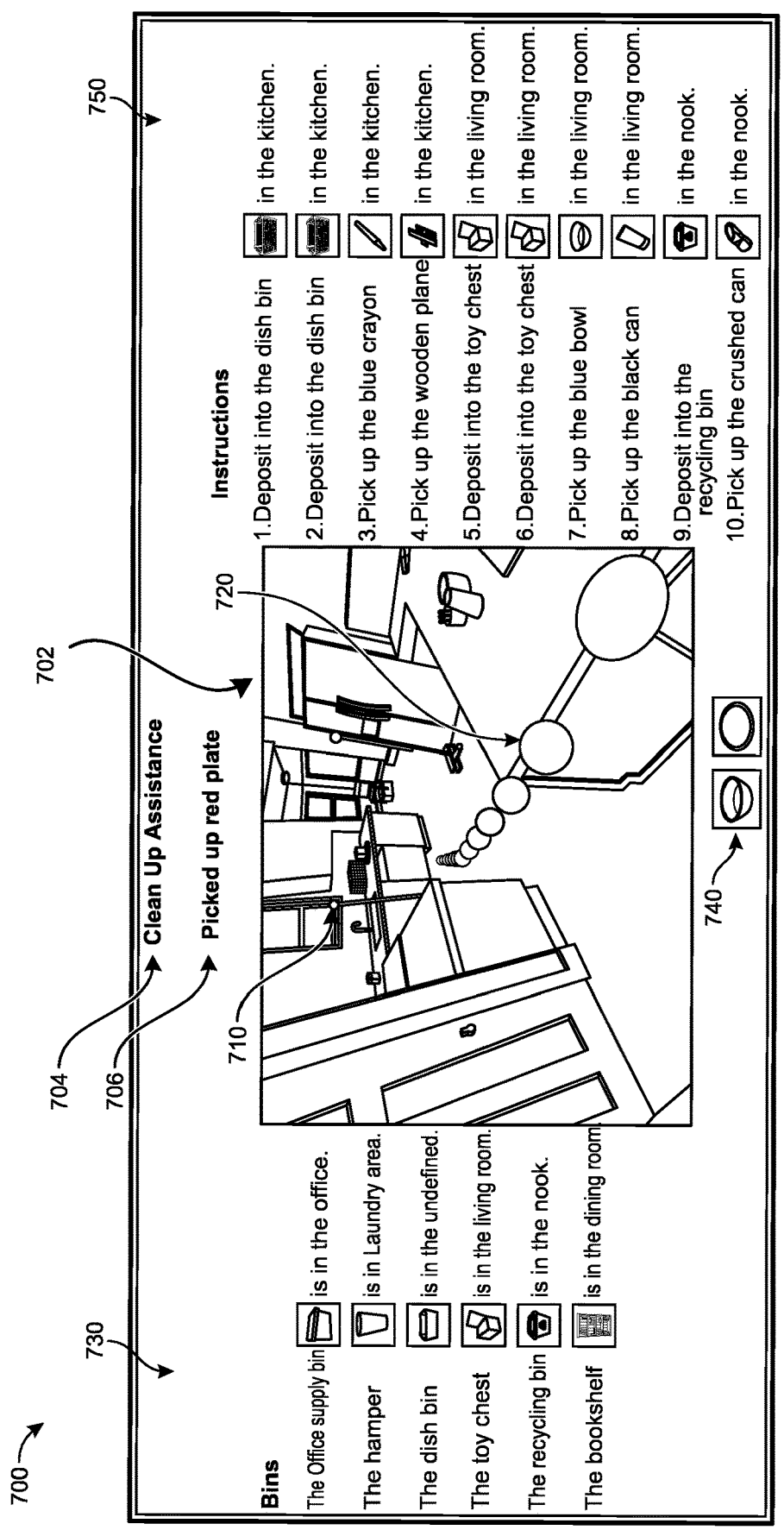
FIG. 7 is an illustration of an exemplary user interface (UI) for artificial-reality-assisted object manipulation.

FIG. 7 illustrates an exemplary user interface (UI) 700 for providing assistance for object-manipulation objectives. UI 700 may include an augmented reality view 702 with additional information presented, such as an objective 704, a completed step 706, an object status 730, held objects 740, and an action sequence 750. Augmented reality view 702 may correspond to the user's view of the user's real-world environment. Augmented reality view 702 may include visual indicator overlays such as a post 710 and an orb 720. Post 710 and/or orb 720 may provide the user visual cues as to particular locations to move to, objects to manipulate, actions to take, etc., as will be described further below.

UI 700 may display objective 704 of the user's task. Objective 704, which may correspond to objectives 224, may display a current object-manipulation objective. In some examples, if there are multiple object-manipulation objectives, objective 704 may indicate which of the multiple object-manipulation objectives are active. Completed step 706 may indicate what action step (which may be part of action sequence 228) the user has most recently completed. In some examples, completed step 706 may instead indicate a most recent status update or other relevant information.

Completed step 706 may be displayed as a status update in conjunction with action sequence 750, which may correspond to action sequence 228. Action sequence 750 may be presented as a list of instructions, as illustrated in FIG. 7. In other examples, action sequence 750 may be presented as landmarks on a map (see, e.g., FIG. 5), shorthand reminders, illustrations and/or animations of action steps, etc. Action sequence 750 may display all action step or a portion thereof. For instance, as action steps are completed, action sequence 750 may remove completed action steps and append action steps to be completed.

Object status 730, which may correspond to objects 222, may provide status information on relevant objects. For example, in FIG. 7, object status 730 may provide information about current locations of objective-relevant objects, such as bins that may correspond to end states 226. In other examples, object status 730 may provide additional information or details that may be useful for the user.

Held objects 740 may indicate what objects the user may be currently manipulating. For example, for the clean up task associated with FIG. 7, held objects 740 may indicate what objects the user is currently holding. Such information may further inform the user what action to take (e.g., where to go to place the objects the user is currently holding).

Figure 8A:
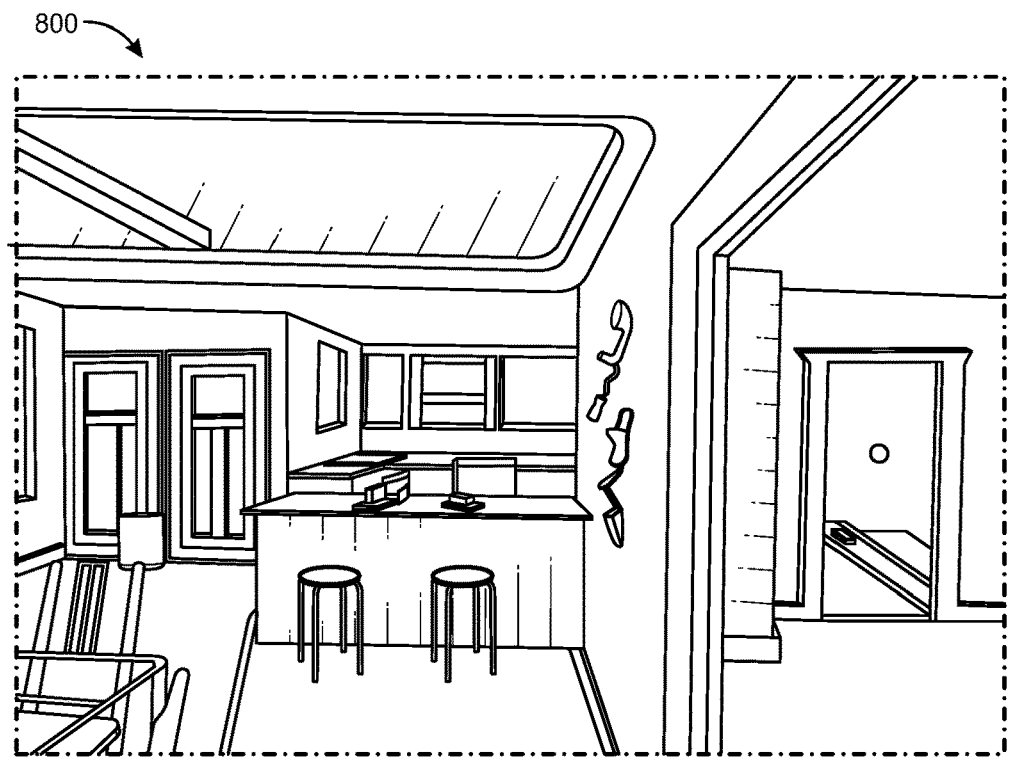
FIGS. 8A-8C are illustrations of exemplary artificial-reality overlays for assisting object-manipulation objectives.
Figure 8B:
Figure 8C:
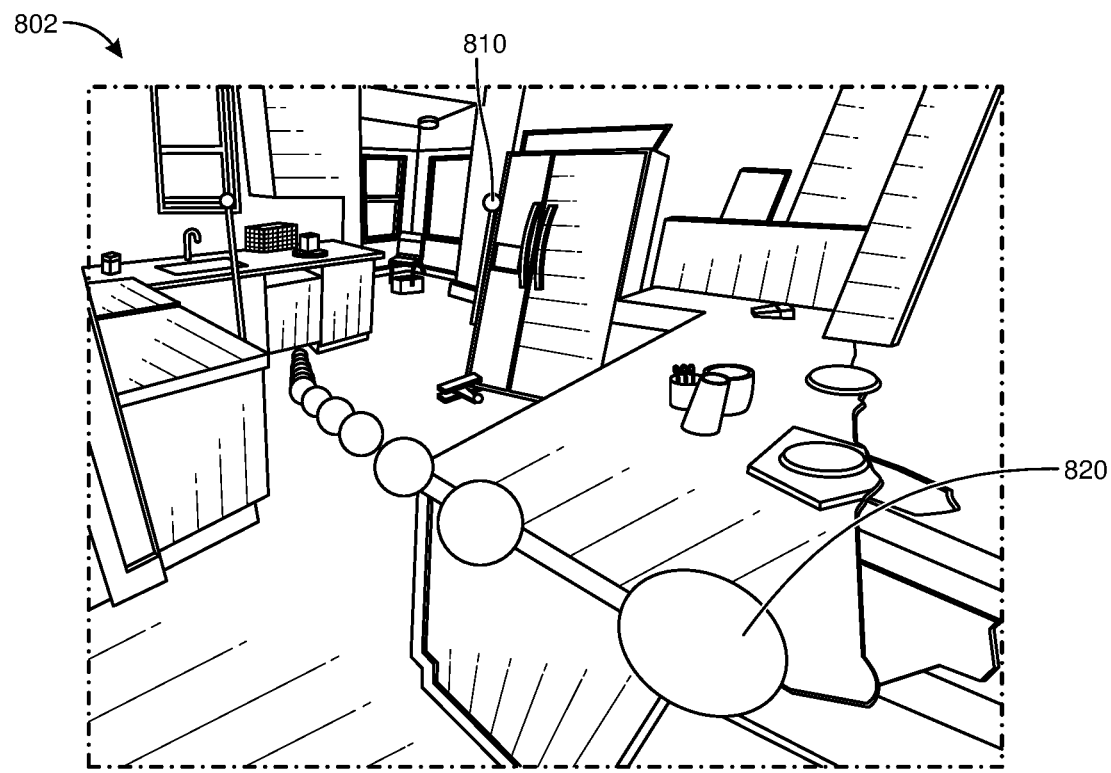

In some examples, the user may be presented with an artificial reality view without an additional 2D interface, as in FIG. 7. FIG. 8A-8C illustrate views 800, 801, and 802, respectively. Views 800, 801, and/or 802, which may correspond to artificial reality view 702, may correspond to the user's current view of the user's real-world environment.

In FIG. 8A, view 800 may show the user's artificial reality view without any visual overlays. In some examples, the user may not wish to see visual indicators. In such examples, the artificial reality system may passively monitor the user's progress for the task such that the user may be able to request information as needed. Alternatively, in such examples, the user may prefer non-visual indicators. For instance, haptic notifications may indicate how close a user is to a particular object (e.g., via increasing magnitude of a haptic response) or serve as a warning (e.g., if the user is moving away from a desired location). Audible notifications may include verbal instructions and/or reminders, warning sounds, audible progress indicators, etc. In other examples, the user's current view may not include visual indicators. For example, as will be described further below, visual indicators may be overlaid onto particular objects and/or locations that may not be in the user's view for view 800.

In FIG. 8B, view 801 may include visual indicators such as a post 810, a post 812, and a highlighted object 814. Post 810 and/or post 812 may serve as visual indicators highlighting locations and/or objects for the user. As illustrated in FIG. 8, post 810 and post 812 may be rendered as 3D objects with perspective such that the user may be able to roughly determine distance. For example, post 810 may be closer to the user than post 812 and thus rendered as a larger post. As the user moves closer to post 812, post 812 may be accordingly rendered larger.

Highlighted object 814, which may be one of objects 222, may provide a visual indication of an object's current location. In some examples, highlighted object 814 may be visible through other objects, such as through a counter as in FIG. 8B.

In FIG. 8C, view 802 may include post 810 and a series of orbs 820. Orbs 820 may act as a digital breadcrumb trail to provide specific path details to the user. By following orbs 820, the user may reach a destination of a given action step. Rather than the user having to decide what exact route to take to the next object or location, orbs 820 may indicate a suggested route for the user.

In some examples, the user may select a level of notification. For example, view 800 may correspond to a minimal or low level of notification. View 801 may correspond to a medium level of notification, in which objects and locations may be highlighted. View 802 may correspond to a maximum or high level of notification, in which paths may be explicitly displayed.

In some examples, as the user completes actions or object statuses change, the related notifications may change. For example, visual notifications may be removed or otherwise changed when no longer relevant or needed, such as orbs 820 disappearing as the user reaches them. Haptic and/or audible notifications may be muted, changed in magnitude, frequency, etc.

In some examples, different colors may be used to provide further information. For example, certain colors may indicate certain statuses, warnings, etc. Changes in color may further indicate changes in such statuses.

In some examples, method 100 may further include monitoring, via the artificial reality system, a progress of the action sequence, detecting, while monitoring the progress, a deviation from the action sequence, and updating the action sequence based on the detected deviation. For example, identification module 204 and/or objective module 206 may detect a deviation from action sequence 228.

Deviations may include, for instance, the user not performing or otherwise not fully completing a current action step (e.g., skipping an action step, incorrectly performing an action step, etc.), non-trivial changes to one or more of objects 222 (e.g., an object becoming unusable, unavailable, or unreachable, reclassifying an identified object, etc.), and/or addition of information and/or data that may update objectives 224 and/or end states 226 (e.g., detecting another user goal, determining incompatibilities or inconsistencies in action sequence 228, etc.).

Sequence module 208 may accordingly update action sequence 228 in response to any detected deviations. Presentation module 210 may accordingly update any notifications in response to updates to action sequence 228. Identification module 204 and/or objective module 206 may continuously monitor for deviations or other changes. Thus, as the user performs action sequence 228, presentation module 210 may present updated notifications in response to real-time changes.

Artificial reality systems such as augmented reality glasses may be able to analyze real-time data of a user's environment to provide assistance in completing tasks. Many tasks, such as house cleaning, packing for a trip, organizing a living space, etc., may be characterized as a problem that may be solved by a computer, such as CVRP, TSP, etc. The artificial reality system may include a map of the user's environment along with real-time localization of the objects and the user within the map. By formalizing and modeling the user's task as a computer-solvable problem, the artificial reality system may be able to provide real-time feedback to assist the user in the task. Whereas conventional artificial reality systems may be specifically programmed to provide assistance in specialized application, such as manufacturing, tourism, surgery, etc., the systems and methods described herein may be more flexible to provide assistance in quotidian tasks such as cooking, cleaning, or organizing. Such assistance may lead to improved task performance, reduced physical and cognitive effort, and a preserved sense of agency for the user. The systems and methods described herein may formalize the problem of computing and displaying artificial reality assistance by associating an optimal action sequence with a policy of an embodied agent, and presenting this optimal action sequence to the user as suggestion notifications in the artificial reality system's heads-up display.

EXAMPLE EMBODIMENTS

Example 1: A computer-implemented method comprising: identifying, via an artificial reality system, a plurality of physical objects in a real-world environment of a user; defining, based on identifying the plurality of objects, an object-manipulation objective for manipulating at least one of the plurality of objects; determining an action sequence that defines a sequence of action steps for manipulating the at least one of the plurality of objects to complete the object-manipulation objective; and presenting, via the artificial reality system, a notification to the user indicative of the action sequence.

Example 2: The method of Example 1, wherein the object-manipulation objective defines a desired end state for the at least one of the plurality of objects and the action sequence includes an action step for manipulating the at least one of the plurality of objects to produce the desired end state.

Example 3: The method of any of Examples 1 and 2, further comprising: monitoring, via the artificial reality system, a progress of the action sequence; detecting, while monitoring the progress, a deviation from the action sequence; and updating the action sequence based on the detected deviation.

Example 4: The method of any of Examples 1-3, wherein defining the object-manipulation objective further comprises: inferring, based on contextual signals and the identification of the plurality of objects, a user goal with respect to the plurality of objects; and selecting, based on the inferred user goal, the object-manipulation objective from a library of objectives.

Example 5: The method of Example 4, wherein the contextual signals include at least one of a time of day, a user input, or a view of the user.

Example 6: The method of any of Examples 4 and 5, wherein: inferring the user goal further comprises inferring a plurality of user goals with respect to the plurality of objects; and selecting the object-manipulation objective further comprises selecting a plurality of object-manipulation objectives from the library of objectives based on the plurality of user goals.

Example 7: The method of any of Examples 1-6, further comprising identifying a current state of the object-manipulation objective.

Example 8: The method of Example 7, wherein the current state includes an uncertain state for a physical object associated with the object-manipulation objective.

Example 9: The method of Example 8, wherein the action sequence includes an action step that is expected to resolve the uncertain state.

Example 10: The method of any of Examples 1-9, wherein the plurality of objects includes known objects and unknown objects.

Example 11: The method of any of Examples 1-10, wherein the object-manipulation objective includes an object-rearrangement task for relocating the at least one of the plurality of objects to a desired location and the action sequence includes at least one action step for moving the at least one of the plurality of objects to the desired location.

Example 12: The method of any of Examples 1-11, wherein the notification includes at least one of a visual notification, a haptic notification, or an audible notification.

Example 13: A system comprising: at least one physical processor; physical memory comprising computer-executable instructions that, when executed by the physical processor, cause the physical processor to: identify, via an artificial reality system, a plurality of physical objects in a real-world environment of a user; define, based on identifying the plurality of objects, an object-manipulation objective for manipulating at least one of the plurality of objects; determine an action sequence that defines a sequence of action steps for manipulating the at least one of the plurality of objects to complete the object-manipulation objective; and present, via the artificial reality system, a notification to the user indicative of the action sequence.

Example 14: The system of Example 13, wherein the object-manipulation objective defines a desired end state for the at least one of the plurality of objects and the action sequence includes an action step for manipulating the at least one of the plurality of objects to produce the desired end state.

Example 15: The system of any of Examples 13 and 14, further comprising instructions that cause the physical processor to: monitor, via the artificial reality system, a progress of the action sequence; detect, while monitoring the progress, a deviation from the action sequence; and update the action sequence based on the detected deviation.

Example 16: The system of any of Examples 13-15, wherein the instructions for defining the object-manipulation objective further cause the processor to: infer, based on contextual signals and the identification of the plurality of objects, a user goal with respect to the plurality of objects; and select, based on the inferred user goal, the object-manipulation objective from a library of objectives.

Example 17: A non-transitory computer-readable medium comprising one or more computer-executable instructions that, when executed by at least one processor of a computing device, cause the computing device to: identify, via an artificial reality system, a plurality of physical objects in a real-world environment of a user; define, based on identifying the plurality of objects, an object-manipulation objective for manipulating at least one of the plurality of objects; determine an action sequence that defines a sequence of action steps for manipulating the at least one of the plurality of objects to complete the object-manipulation objective; and present, via the artificial reality system, a notification to the user indicative of the action sequence.

Example 18: The non-transitory computer-readable medium of Example 17, wherein the object-manipulation objective defines a desired end state for the at least one of the plurality of objects and the action sequence includes an action step for manipulating the at least one of the plurality of objects to produce the desired end state.

Example 19: The non-transitory computer-readable medium of any of Examples 17 and 18, further comprising instructions that cause the computing device to: monitor, via the artificial reality system, a progress of the action sequence; detect, while monitoring the progress, a deviation from the action sequence; and update the action sequence based on the detected deviation.

Example 20: The non-transitory computer-readable medium of any of Examples 17-19, wherein the instructions for defining the object-manipulation objective further cause the computing device to: infer, based on contextual signals and the identification of the plurality of objects, a user goal with respect to the plurality of objects; and select, based on the inferred user goal, the object-manipulation objective from a library of objectives.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
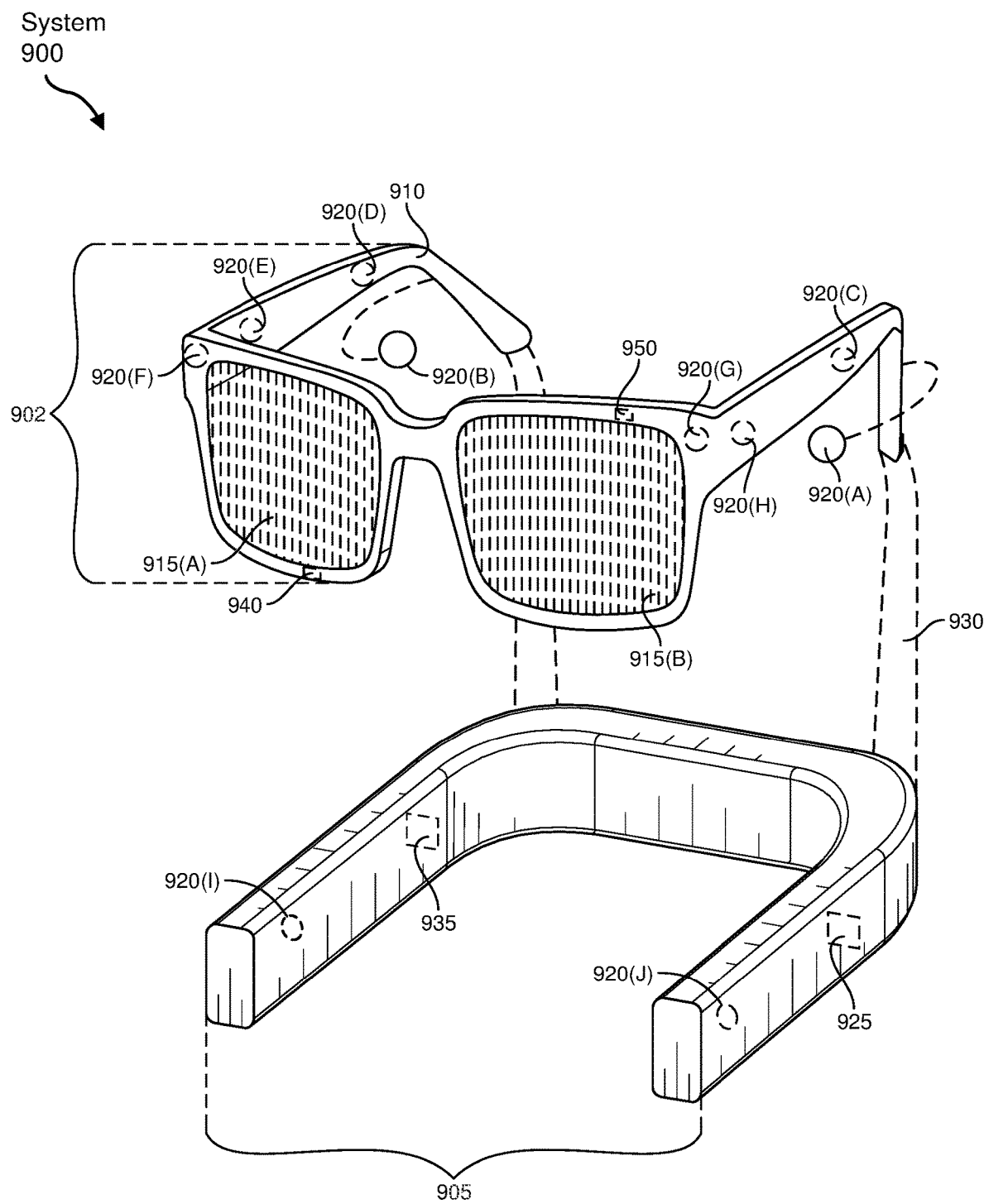
FIG. 9 is an illustration of exemplary augmented-reality glasses that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor.

In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920 (G), and 920(H), which may be positioned at various locations on frame 910, and/or acoustic transducers 920(I) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920(D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including Wi-Fi, BLUETOOTH, global positioning system (GPS), cellular or other communication devices may be also used to determine a user's location relative to a radio transceiver or group of transceivers (e.g., a Wi-Fi router or group of GPS satellites). Acoustic sensors such as microphone arrays or 2D or 3D sonar sensors may also be used to determine a user's location within an environment. Augmented-reality and virtual-reality devices (such as systems 900 and 1000 of FIGS. 9 and 10, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

As noted, artificial-reality systems 900 and 1000 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 11:
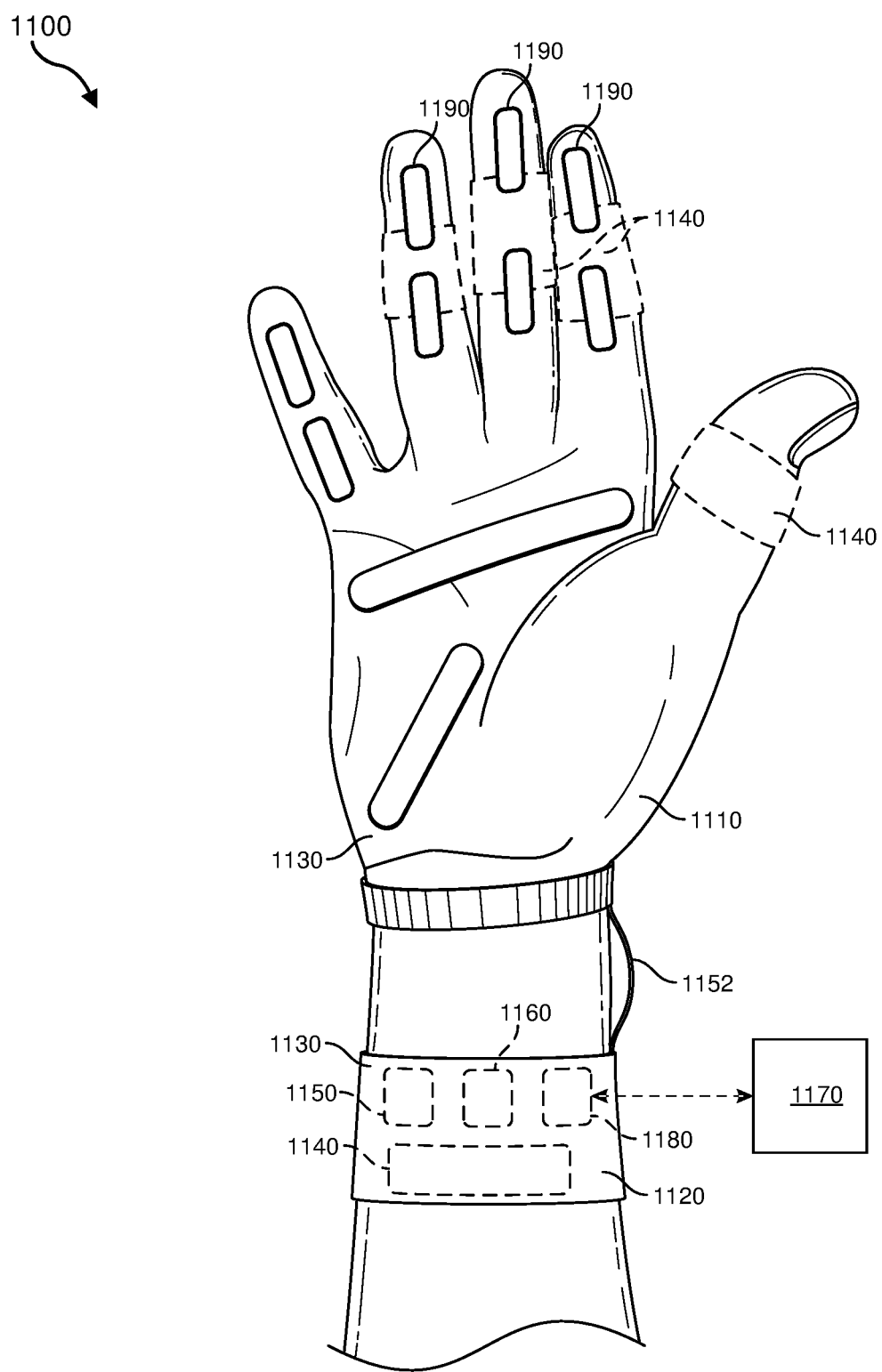
FIG. 11 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 11 illustrates a vibrotactile system 1100 in the form of a wearable glove (haptic device 1110) and wristband (haptic device 1120). Haptic device 1110 and haptic device 1120 are shown as examples of wearable devices that include a flexible, wearable textile material 1130 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 1140 may be positioned at least partially within one or more corresponding pockets formed in textile material 1130 of vibrotactile system 1100. Vibrotactile devices 1140 may be positioned in locations to provide a vibrating sensation (e.g., haptic feedback) to a user of vibrotactile system 1100. For example, vibrotactile devices 1140 may be positioned against the user's finger(s), thumb, or wrist, as shown in FIG. 11. Vibrotactile devices 1140 may, in some examples, be sufficiently flexible to conform to or bend with the user's corresponding body part(s).

A power source 1150 (e.g., a battery) for applying a voltage to the vibrotactile devices 1140 for activation thereof may be electrically coupled to vibrotactile devices 1140, such as via conductive wiring 1152. In some examples, each of vibrotactile devices 1140 may be independently electrically coupled to power source 1150 for individual activation. In some embodiments, a processor 1160 may be operatively coupled to power source 1150 and configured (e.g., programmed) to control activation of vibrotactile devices 1140.

Vibrotactile system 1100 may be implemented in a variety of ways. In some examples, vibrotactile system 1100 may be a standalone system with integral subsystems and components for operation independent of other devices and systems. As another example, vibrotactile system 1100 may be configured for interaction with another device or system 1170. For example, vibrotactile system 1100 may, in some examples, include a communications interface 1180 for receiving and/or sending signals to the other device or system 1170. The other device or system 1170 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1180 may enable communications between vibrotactile system 1100 and the other device or system 1170 via a wireless (e.g., Wi-Fi, BLUETOOTH, cellular, radio, etc.) link or a wired link. If present, communications interface 1180 may be in communication with processor 1160, such as to provide a signal to processor 1160 to activate or deactivate one or more of the vibrotactile devices 1140.

Vibrotactile system 1100 may optionally include other subsystems and components, such as touch-sensitive pads 1190, pressure sensors, motion sensors, position sensors, lighting elements, and/or user interface elements (e.g., an on/off button, a vibration control element, etc.). During use, vibrotactile devices 1140 may be configured to be activated for a variety of different reasons, such as in response to the user's interaction with user interface elements, a signal from the motion or position sensors, a signal from the touch-sensitive pads 1190, a signal from the pressure sensors, a signal from the other device or system 1170, etc.

Although power source 1150, processor 1160, and communications interface 1180 are illustrated in FIG. 11 as being positioned in haptic device 1120, the present disclosure is not so limited. For example, one or more of power source 1150, processor 1160, or communications interface 1180 may be positioned within haptic device 1110 or within another wearable textile.

Figure 12:
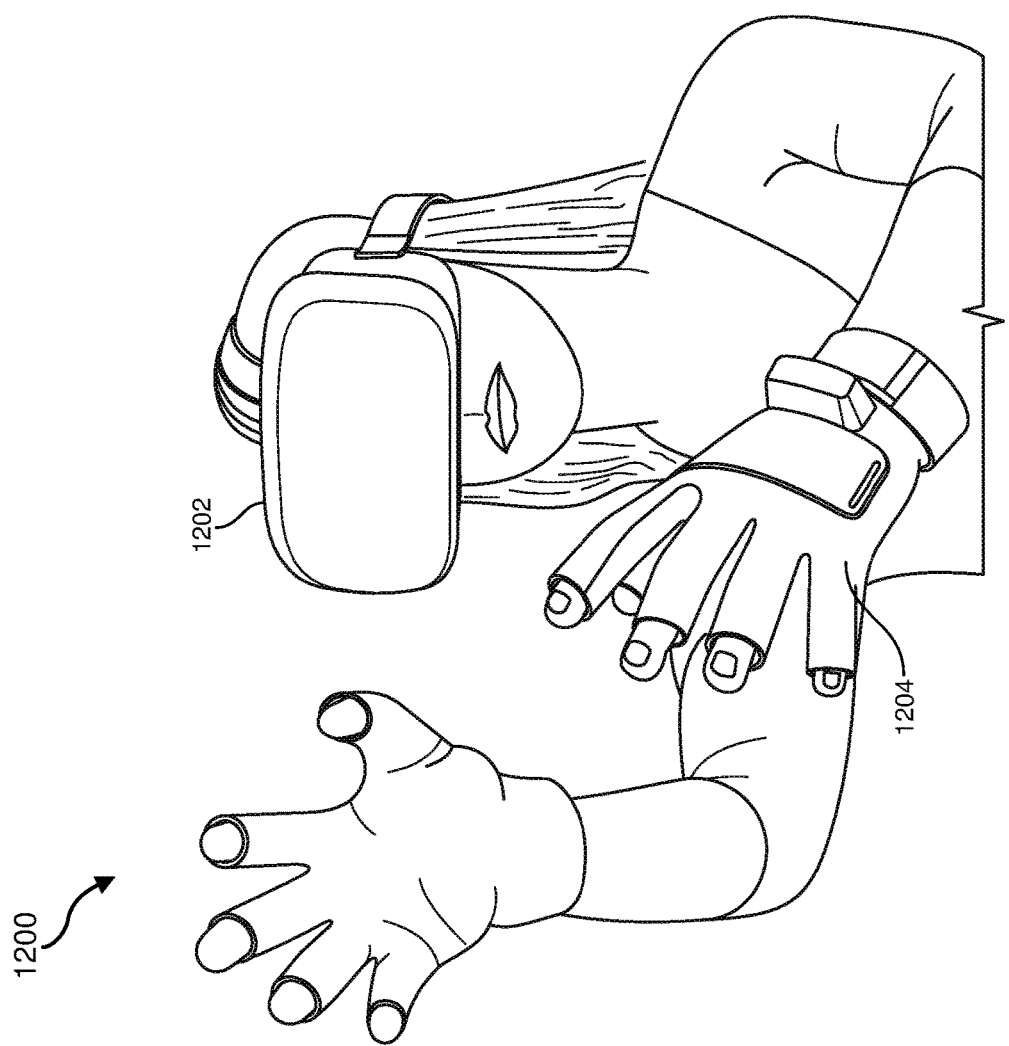
FIG. 12 is an illustration of an exemplary virtual-reality environment according to embodiments of this disclosure.

Haptic wearables, such as those shown in and described in connection with FIG. 11, may be implemented in a variety of types of artificial-reality systems and environments. FIG. 12 shows an example artificial-reality environment 1200 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 10:
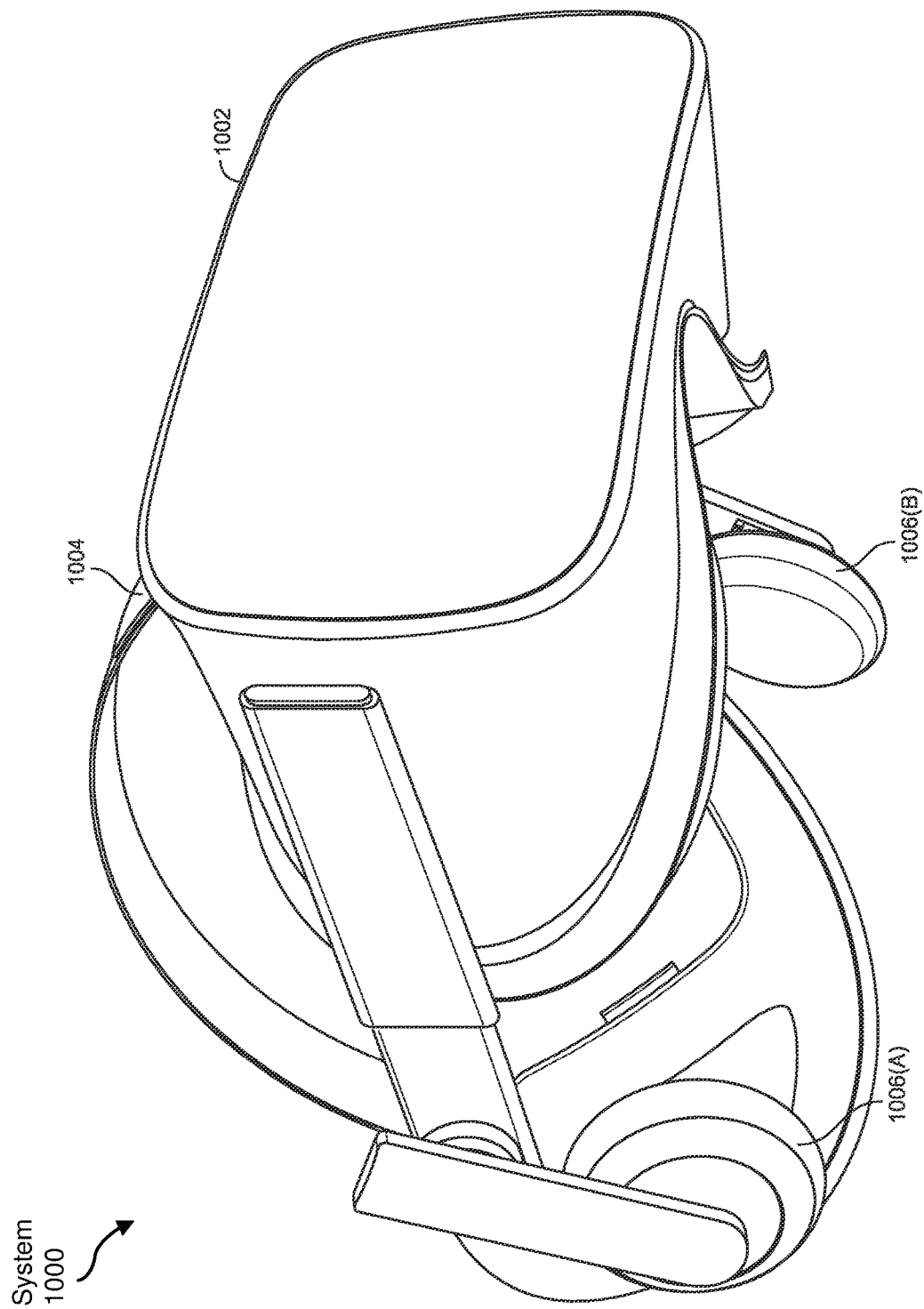
FIG. 10 is an illustration of an exemplary virtual-reality headset that may be used in connection with embodiments of this disclosure.

Head-mounted display 1202 generally represents any type or form of virtual-reality system, such as virtual-reality system 1000 in FIG. 10. Haptic device 1204 generally represents any type or form of wearable device, worn by a user of an artificial-reality system, that provides haptic feedback to the user to give the user the perception that he or she is physically engaging with a virtual object. In some embodiments, haptic device 1204 may provide haptic feedback by applying vibration, motion, and/or force to the user. For example, haptic device 1204 may limit or augment a user's movement. To give a specific example, haptic device 1204 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1204 to send action requests to a console. Examples of action requests include, without limitation, requests to start an application and/or end the application and/or requests to perform a particular action within the application.

Figure 13:
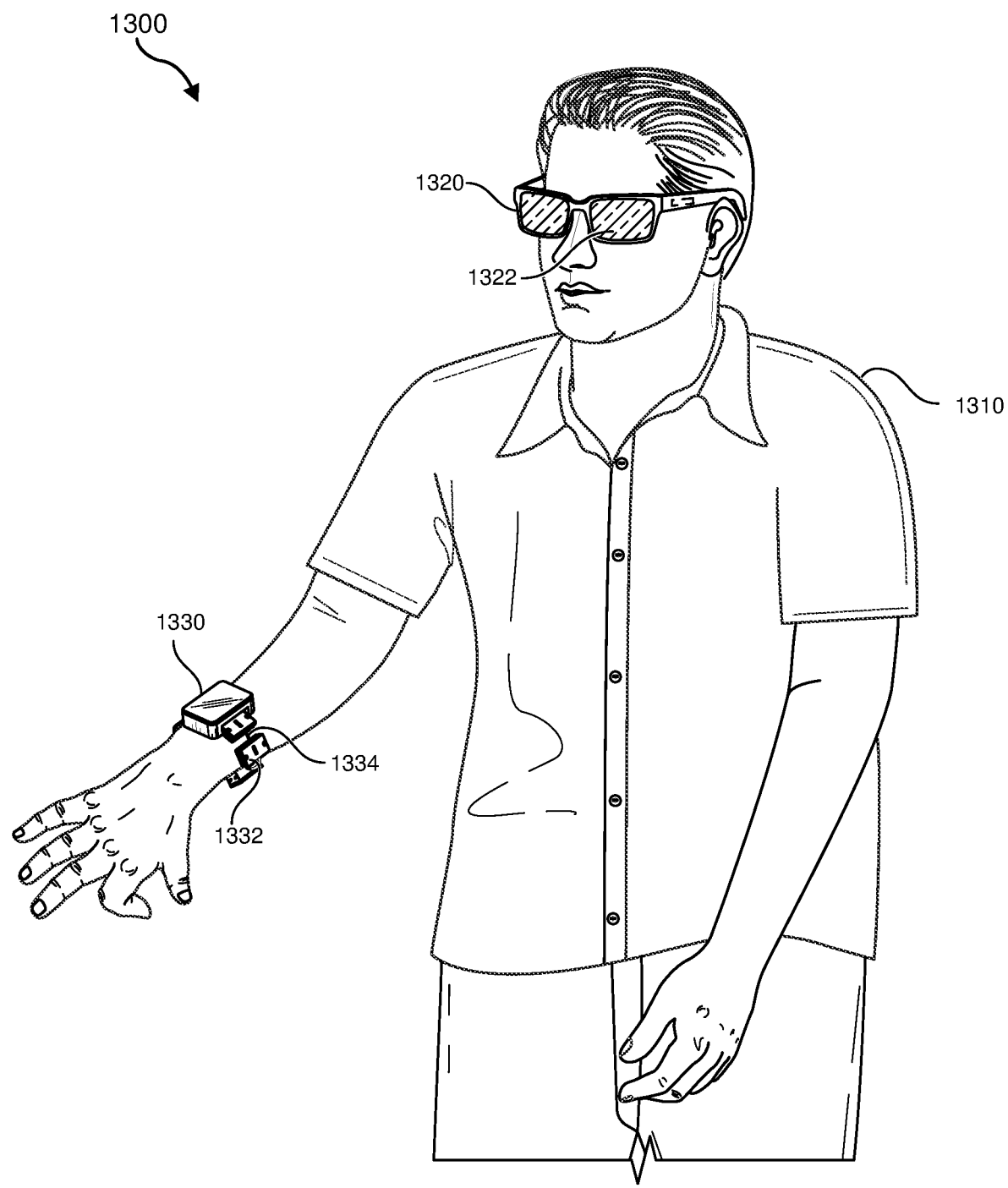
FIG. 13 is an illustration of an exemplary augmented-reality environment according to embodiments of this disclosure.

While haptic interfaces may be used with virtual-reality systems, as shown in FIG. 12, haptic interfaces may also be used with augmented-reality systems, as shown in FIG. 13. FIG. 13 is a perspective view of a user 1310 interacting with an augmented-reality system 1300. In this example, user 1310 may wear a pair of augmented-reality glasses 1320 that may have one or more displays 1322 and that are paired with a haptic device 1330. In this example, haptic device 1330 may be a wristband that includes a plurality of band elements 1332 and a tensioning mechanism 1334 that connects band elements 1332 to one another.

One or more of band elements 1332 may include any type or form of actuator suitable for providing haptic feedback. For example, one or more of band elements 1332 may be configured to provide one or more of various types of cutaneous feedback, including vibration, force, traction, texture, and/or temperature. To provide such feedback, band elements 1332 may include one or more of various types of actuators. In one example, each of band elements 1332 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1110, 1120, 1204, and 1330 may include any suitable number and/or type of haptic transducer, sensor, and/or feedback mechanism. For example, haptic devices 1110, 1120, 1204, and 1330 may include one or more mechanical transducers, piezoelectric transducers, and/or fluidic transducers. Haptic devices 1110, 1120, 1204, and 1330 may also include various combinations of different types and forms of transducers that work together or independently to enhance a user's artificial-reality experience. In one example, each of band elements 1332 of haptic device 1330 may include a vibrotactor (e.g., a vibrotactile actuator) configured to vibrate in unison or independently to provide one or more of various types of haptic sensations to a user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive artificial reality data to be transformed, transform the data, output a result of the transformation to recognize objects, use the result of the transformation to determine an action sequence, and store the result of the transformation to provide notifications for the action sequence. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
identifying, via an artificial reality system, a plurality of physical objects in a real-world environment of a user;
inferring, based at least on identifying the plurality of objects, a user goal with respect to the plurality of objects;
defining, based on identifying the plurality of objects and the inferred user goal, an object-manipulation objective for manipulating at least one of the plurality of objects;
determining an action sequence that defines a sequence of action steps for manipulating the at least one of the plurality of objects to complete the object-manipulation objective; and
presenting, via the artificial reality system, a notification to the user indicative of the action sequence.

2. The method of claim 1, wherein the object-manipulation objective defines a desired end state for the at least one of the plurality of objects and the action sequence includes an action step for manipulating the at least one of the plurality of objects to produce the desired end state.

3. The method of claim 1, further comprising:
monitoring, via the artificial reality system, a progress of the action sequence;
detecting, while monitoring the progress, a deviation from the action sequence; and
updating the action sequence based on the detected deviation.

4. The method of claim 1, wherein:
inferring the user goal is further based on contextual signals; and
defining the object-manipulation objective further comprises
selecting, based on the inferred user goal, the object-manipulation objective from a library of objectives.

5. The method of claim 4, wherein the contextual signals include at least one of a time of day, a user input, or a view of the user.

6. The method of claim 4, wherein:
inferring the user goal further comprises inferring a plurality of user goals with respect to the plurality of objects; and
selecting the object-manipulation objective further comprises selecting a plurality of object-manipulation objectives from the library of objectives based on the plurality of user goals.

7. The method of claim 1, further comprising identifying a current state of the object-manipulation objective.

8. The method of claim 7, wherein the current state includes an uncertain state for a physical object associated with the object-manipulation objective.

9. The method of claim 8, wherein the action sequence includes an action step that is expected to resolve the uncertain state.

10. The method of claim 1, wherein the plurality of objects includes known objects and unknown objects.

11. The method of claim 1, wherein the object-manipulation objective includes an object-rearrangement task for relocating the at least one of the plurality of objects to a desired location and the action sequence includes at least one action step for moving the at least one of the plurality of objects to the desired location.

12. The method of claim 1, wherein the notification includes at least one of a visual notification, a haptic notification, or an audible notification.

13. A system comprising:
at least one physical processor;
physical memory comprising computer-executable instructions that, when executed by the physical processor, cause the physical processor to:
identify, via an artificial reality system, a plurality of physical objects in a real-world environment of a user;
infer, based at least on identifying the plurality of objects, a user goal with respect to the plurality of objects;
define, based on identifying the plurality of objects and the inferred user goal, an object-manipulation objective for manipulating at least one of the plurality of objects;
determine an action sequence that defines a sequence of action steps for manipulating the at least one of the plurality of objects to complete the object-manipulation objective; and
present, via the artificial reality system, a notification to the user indicative of the action sequence.

14. The system of claim 13, wherein the object-manipulation objective defines a desired end state for the at least one of the plurality of objects and the action sequence includes an action step for manipulating the at least one of the plurality of objects to produce the desired end state.

15. The system of claim 13, further comprising instructions that cause the physical processor to:
monitor, via the artificial reality system, a progress of the action sequence;
detect, while monitoring the progress, a deviation from the action sequence; and
update the action sequence based on the detected deviation.

16. The system of claim 13, wherein the instructions for defining the object-manipulation objective further cause the processor to:
infer, further based on contextual signals, the user goal with respect to the plurality of objects; and
select, based on the inferred user goal, the object-manipulation objective from a library of objectives.

17. A non-transitory computer-readable medium comprising one or more computer-executable instructions that, when executed by at least one processor of a computing device, cause the computing device to:
identify, via an artificial reality system, a plurality of physical objects in a real-world environment of a user;
infer, based at least on identifying the plurality of objects, a user goal with respect to the plurality of objects;
define, based on identifying the plurality of objects and the inferred user goal, an object-manipulation objective for manipulating at least one of the plurality of objects;
determine an action sequence that defines a sequence of action steps for manipulating the at least one of the plurality of objects to complete the object-manipulation objective; and
present, via the artificial reality system, a notification to the user indicative of the action sequence.

18. The non-transitory computer-readable medium of claim 17, wherein the object-manipulation objective defines a desired end state for the at least one of the plurality of objects and the action sequence includes an action step for manipulating the at least one of the plurality of objects to produce the desired end state.

19. The non-transitory computer-readable medium of claim 17, further comprising instructions that cause the computing device to:
monitor, via the artificial reality system, a progress of the action sequence;
detect, while monitoring the progress, a deviation from the action sequence; and
update the action sequence based on the detected deviation.

20. The non-transitory computer-readable medium of claim 17, wherein the instructions for defining the object-manipulation objective further cause the computing device to:
infer, further based on contextual signals, the user goal with respect to the plurality of objects; and
select, based on the inferred user goal, the object-manipulation objective from a library of objectives.

* * * * *